(No Model.) 2 Sheets—Sheet 1.
M. HUTIN & M. LEBLANC.
ASYNCHRONOUS MOTOR.

No. 545,693. Patented Sept. 3, 1895.

WITNESSES:
M. D. Bloudel.
F. T. Chapman.

INVENTORS
Maurice Hutin.
Maurice Leblanc.
BY
Joseph Lyons
ATTORNEY.

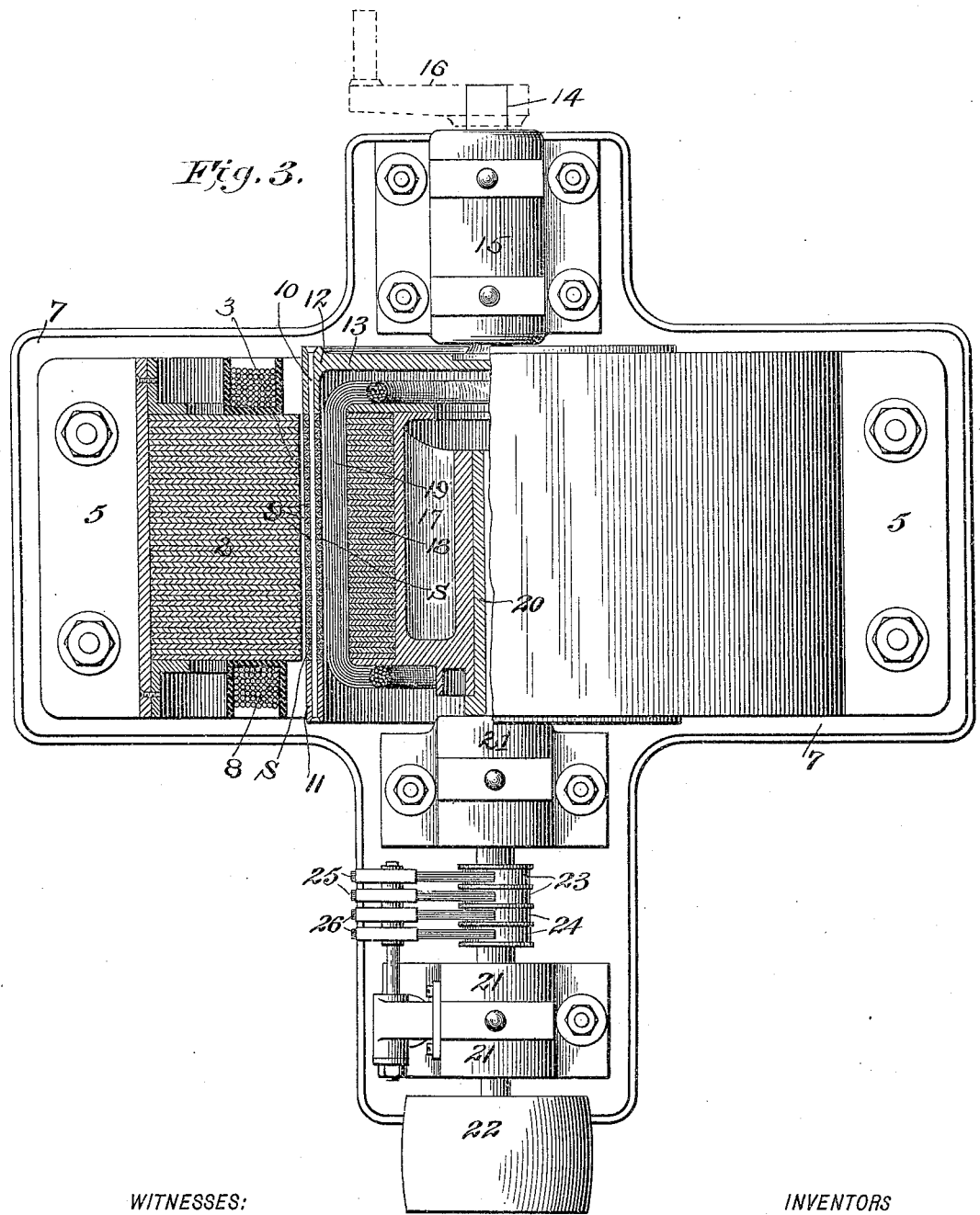

United States Patent Office.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

ASYNCHRONOUS MOTOR.

SPECIFICATION forming part of Letters Patent No. 545,693, dated September 3, 1895.

Application filed April 19, 1895. Serial No. 546,408. (No model.) Patented in France May 12, 1894, No. 238,502; in Germany May 26, 1894, No. 79,588; in Austria June 4, 1894, No. 44/5,477, and in Belgium September 29, 1894, No. 112,045.

*To all whom it may concern:*

Be it known that we, MAURICE HUTIN and MAURICE LEBLANC, citizens of the Republic of France, and residents of Paris, in the Department of the Seine, Republic of France, have invented certain new and useful Improvements in Monophase Asynchronous Motors, (patented in France, No. 238,502, dated May 12, 1894; in Germany, No. 79,588, dated May 26, 1894; in Austria, No. 44/5,477, dated June 4, 1894, and in Belgium, No. 112,045, dated September 29, 1894,) of which the following is a specification.

Our invention has reference to improvements in single-phase alternating motors and in the method of operating the same, the object of the invention being to so construct and operate single-phase alternating-current motors that they may be run asynchronously and may be started and reversed under load.

The principle of our invention is explained with reference to the accompanying drawings, which show, in—

Figure 1:
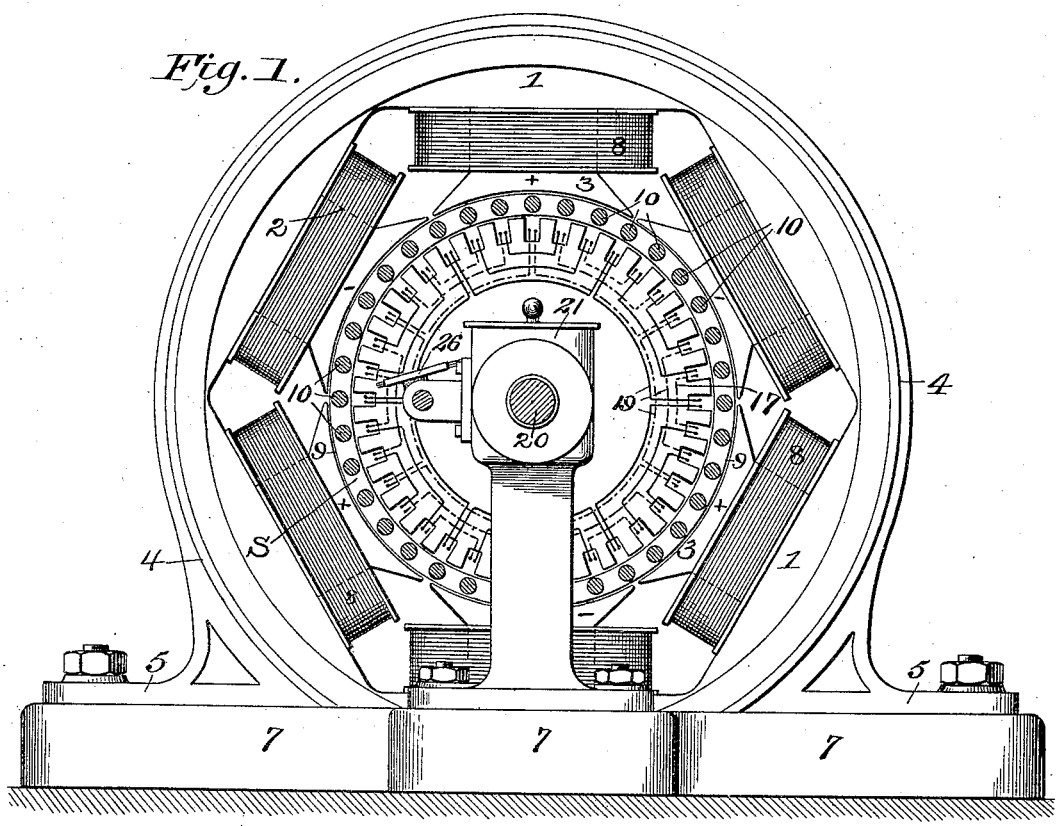
Figure 2:
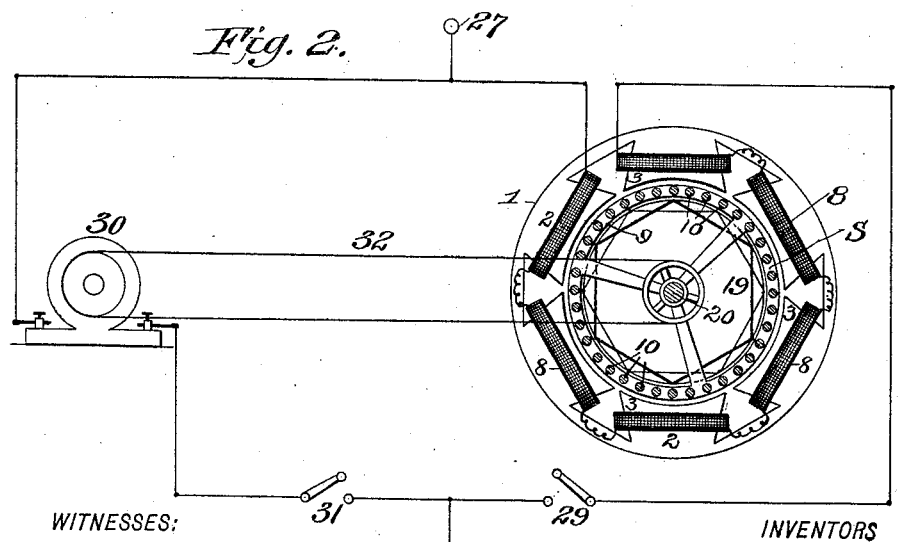

Figure 1, an end elevation, partly in section, of a motor constructed in accordance with our invention; in Fig. 2, a diagram of the field and armature circuit arrangements and connections of the motor, and in Fig. 3 a plan view of the motor partly in section.

Like numerals and letters of reference indicate like parts throughout the drawings.

The magnetic field of force of the motor is provided by a system of electromagnets composed of a laminated circular iron frame 1, from which an even number of radial magnet-cores 2, having polar extensions 3, project inwardly. The cores and polar extensions are likewise laminated and may be integral with the frame 1, or may be separately constructed and properly secured to the frame, which thus constitutes the common yoke of the magnets. This common yoke 1 is fitted to and secured in an annular supporting-frame 4, which is formed with flanges 5 5 6 6, resting upon and bolted to the base-plate 7 of the machine. Upon the cores are magnetizing-coils 8, each wound in the reverse direction to the windings of the next adjacent cores and all connected in a single series, so that if a current of any kind is passed through the coils the magnetic polarities in the successive pole-pieces will at all times be of opposite denomination. This is indicated by the plus (+) and minus (−) signs marked on the polar expansions. The inner ends of these polar expansions are shaped to conform each to the arc of a circle, as usual. A single-phase alternating current is passed through the coils and the magnetizing effect of the circular series of alternate and alternating polarities must be considered in order to understand the principle of our invention. In a system of this kind we may assume that the combined magnetizing forces tend to generate two magnetic fluxes of equal and constant intensity in the direction of a diameter, but rotating with equal speed in opposite directions about the geometrical axis of the circular row of pole-faces. These two rotary fluxes may, therefore, be considered as the components of the alternating fluxes which proceed from the fixed poles, and if one of these components—that is to say, one of the rotary fluxes or rotary polar lines—can be removed or consumed the other flux or rotary polar line will be available for useful work. Now it is a fact that if an armature with a closed circuit or circuits is rotated in inductive relation to a rotary field, but in a direction opposed to the direction of rotation of the field, currents are induced in the armature, which by the law of electrical reaction tend to produce a magnetic flux which is opposed to that which created them. If, therefore, the armature-circuits have very low resistance, and if they are rotated with sufficient speed, the currents generated in the same will consume or practically consume the generating magnetic flux. Upon these considerations the construction of our motor and the manner of operating the same is based.

Disregarding for the moment the armature proper of our motor, we dispose a rotatable auxiliary armature or flux-screen S close to the field-poles. This flux-screen consists of a hollow cylinder built up of annular iron laminæ 9, all insulated from each other, and the whole traversed by copper rods 10, which at their ends are riveted or otherwise secured to bronze or copper cheeks 11 12, as shown, whereby the iron laminæ are rigidly held together. The cheek 11 is a simple annulus, while the cheek 12 is a thimble, from the center of the closed end 13 of which extends a shaft 14, which is mounted in bearings 15, and is provided at its free end with a crank 16, or other means for rotating the flux-screen. The copper rods 10, together with the cheeks 11 12, constitute armature-circuits of very low resistance, closed upon themselves, which may be rotated in the magnetic field with any desired speed and with the expenditure of little force. The period of the alternating current which energizes the field-magnets is designated by T, and the number of poles of the magnets by $2^n$. The speed of rotation of the two opposing fluxes will then be $\frac{1}{nT}$. If now the flux-screen is rotated either by the crank 16 or by any other means with a speed equal or nearly equal to that of the rotation of the fluxes, then the relative speed of the screen will be with reference to the flux which rotates in the same direction equal to the difference of the speeds of the screen and of the flux, and with reference to the flux which rotates in the opposite direction it will be equal to the sum of the speeds of the screen and flux. From this it follows that this last flux, the one turning in opposition to the screen, will generate currents of considerable strength in the circuits of the screen. These currents are opposed to those passing through the field-magnets and react upon the latter, so as to neutralize the flux which created them. On the other hand, the flux which turns in the same direction as the screen may become very powerful without generating appreciable currents in the screen-circuits, so that this last flux may operate as a simple rotary field upon any properly-constructed armature situated in the cylindrical space inclosed by the inner walls of the screen, and may constitute with the latter an asynchronous motor which would start under load. A contemplation of the theoretical results thus far deduced will show that we obtain a constant rotary field from single-phase alternating electric currents, which pass through the coils of a circular row of field-magnets in an invariable manner, and that this result is obtained by the obliteration or consumption of one of the two equal and oppositely-turning potential fluxes, which characterize such row of magnets. The theoretical deductions we verified in practice by actually obtaining an asynchronous motor constructed in accordance with the principles set forth. We therefore believe that our theory is correct, and shall henceforth treat it as an established theorem; but nevertheless we do not mean to be confined to that theory or to limit our invention in view of the same.

The armature proper 17 may be of any suitable well-known construction so long as it has one or more, and preferably two, windings, each closed upon itself or including a regulating device. In the drawings we show a Pacinotti ring 18 built up of iron lamina and provided with two windings 19, which cross each other, as shown. The armature is keyed to a shaft 20, supported in bearings 21 21, and carrying a pulley 22 for connection with the machinery to be driven by the motor. The armature-circuits are either closed upon themselves or their terminals may be connected to two pairs of collector-rings 23 24, upon which bear the two pairs of brushes 25 26, between which means for controlling the speed or power may be inserted.

The motor is started as follows: The flux-screen is set in rotation by the crank 16 or by a small auxiliary motor, and after it has attained a considerable speed the current is admitted to the field magnets. The immediate effect of this is that the flux-screen is speeded up to very nearly synchronism, obliterating one of the fluxes, as before explained, and only permitting the passage of the other flux to the armature, which is now under the influence of a single rotating flux and starts under load from any position. The direction of rotation of the flux-screen evidently determines the direction of rotation of the armature. These two directions are always the same, so that if it is desired to rotate the armature to the right or to the left the flux-screen must be rotated to the right or left, respectively. The flux-screen, mechanically considered, is an idle fly-wheel consuming very little power, and a few brisk turns of the crank are sufficient to impart to this fly-wheel the necessary speed. For motors of very large size it is preferable to use a small auxiliary motor for starting the flux-screen. This may be an ordinary synchronous single-phase alternating-current motor with permanent field-magnets; but we are not limited to any particular means for starting the flux-screen.

In Fig. 2 the diagram shows the circuit connections with an auxiliary motor for starting the flux-screen. The alternating current is admitted by the binding-post 27 28, between one of which and the field magnet-coils 8 is located a switch 29. In a shunt around the field-coils is the small auxiliary motor 30, the circuit to which is controlled by a switch 31. The motor 30 is mechanically connected with the flux-screen S, as by a belt 32, or in any other suitable manner. To start the motor the switch 31 is closed, whereby the auxiliary motor 30 is promptly started, since it has practically no load. As soon as the screen S has attained a considerable speed, which it does in a few seconds, the switch 29 is closed and the switch 31 opened. The armature then starts promptly under load. An auxiliary motor for starting the flux-screen will only be necessary for motors of large size.

It will be understood that we are not limited to the exact embodiment of our invention herein shown and described, nor to the details of construction of any particular part, since with the observance of the fundamental principles of our invention the general arrangement and special constructions may be variously changed without departing from our invention.

Having now fully described our invention, we claim and desire to secure by Letters Patent—

1. The method of starting and running single phase alternating current motors in either direction, which consists in rotating in the direction to be given to the armature and between the same and a circular row of alternately wound field magnets, a flux screen containing circuits closed upon themselves, and passing single phase alternating currents through the field coils, substantially as described.

2. The method of starting and running single phase alternating current motors in either direction, which consists in first rotating by external power in the direction to be given to the armature and between the same and a circular row of alternately wound field magnets, a flux screen containing circuits closed upon themselves, then passing single phase alternating currents through the field coils and then withdrawing the external power, substantially as described.

3. The method of producing a rotating field of force, which consists in rotating a flux screen containing circuits closed upon themselves in inductive proximity to a circular row of alternately wound magnets, and passing single phase alternating currents through the magnet coils, substantially as described.

4. The method of producing a rotating field of force, which consists in rotating by external power a flux screen containing circuits closed upon themselves, in inductive proximity to a circular row of alternately wound magnets, passing single phase alternating current through the magnet coils and then withdrawing the external power, substantially as described.

5. An asynchronous, single phase alternating current motor, consisting of a circular row of alternately wound field magnets, adapted to be energized by a single phase current, a rotating armature, a rotatable flux screen between the armature and field magnets containing circuits closed upon themselves, and means for starting the rotation of the flux screen by external power, substantially as described.

6. An asynchronous single phase alternating current motor, consisting of a circular row of alternately wound field magnets, the coils whereof are in a single series for the reception of a single phase alternating current, an armature, a flux screen situated between the armature and field magnets, composed of a laminated iron cylinder with circuits threading through the same, and means for starting the rotation of the flux screen by external power, substantially as described.

In testimony whereof we have signed our names to this specification in the presence of two subscribing witnesses.

MAURICE HUTIN.
MAURICE LEBLANC.

Witnesses:
CLYDE SHROPSHIRE,
J. J. BOUR.